Sept. 19, 1950 K. C. HANSON 2,522,785
PIPE JOINT AND UNION
Filed July 15, 1946
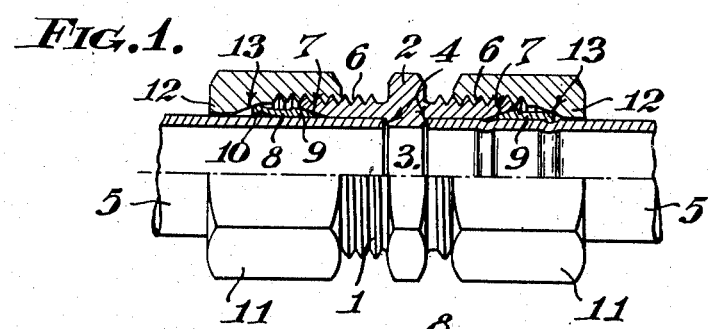
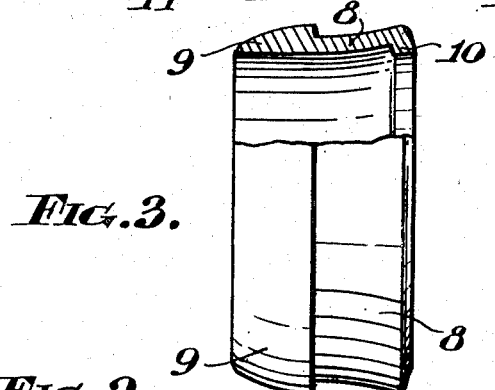
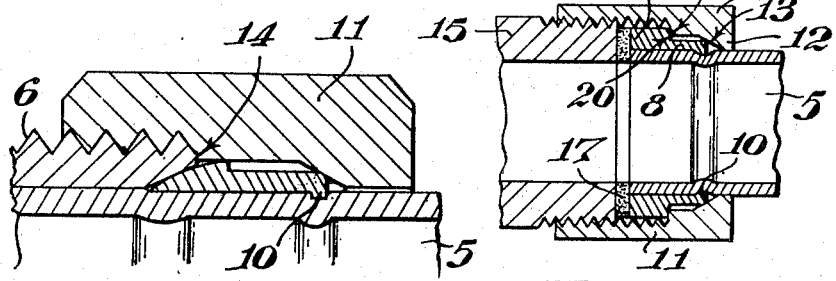
INVENTOR
KENNETH C. HANSON
By Emory L. Groff Atty Patented Sept. 19, 1950

2,522,785

UNITED STATES PATENT OFFICE 2,522,785

PIPE JOINT AND UNION

Kenneth Cecil Hanson, Surbiton, England

Application July 15, 1946, Serial No. 683,638
In Great Britain July 20, 1945

7 Claims. (Cl. 285—122)

1

This invention relates to pipe joints and unions, and in particular to the jointing of pipes for fluid under pressure, wherein a union is employed to couple the pipes, which union consists of a fitting adapted to receive the pipe end or a plurality of pipe ends as desired, and a relatively movable tightening member such as a gland nut, the said fitting and member being constructed in such a manner that a ferrule or thimble can be placed on the pipe end within the fitting, the shaping and construction of the parts being such that the tightening up of the member will result in the deformation of the ferrule and at the same time owing to the formation of the parts, form an effective joint and seal.

The object of this invention is to provide a means wherein an effective coupling and sealing can be obtained, the parts being comparatively cheap and easy to produce.

A further object is to provide a coupling wherein the ferrule will grip round the pipe as well as forming a seal within the fitting due to the tightening up of the parts. Another object is to provide a coupling wherein, as well as gripping the pipe, the front end of the ferrule and pipe are forced into a shaped recess in the fitting.

A still further object is to provide a coupling wherein the main gripping of the ferrule on the pipe is a short distance from the pipe end.

With the above and other objects which will be apparent from the following specification in view, reference will now be made to the accompanying drawings illustrating various preferred methods of carrying the invention into practice. In the drawings:

Figure 1 shows partly in section a pipe coupling union with the left hand side of the figure before tightening and the other side after tightening.

Figure 2 is a fragmentary view of a modification of the coupling shown in Figure 1.

Figure 3 is an enlarged view of the thimble or ferrule.

Figure 4 shows another form of union applied to a flat ended fitting such as a pillar cock, and Figures 5 and 6 are alternative arrangements of the coupling shown in Figure 4. In Figures 4, 5 and 6 the parts are shown tightened.

Referring firstly to the union joint illustrated in Figure 1, there is provided a union sleeve or fitting 1 with a central hexagonal nut portion 2 and an internal rim 3 to provide shoulders or seats 4, 4, one for each inserted pipe end 5. It will be appreciated however that any suitable or conventional type of fitting may be employed instead of the straight union, for example, T or Y or other type.

The two portions on each side of the nut are externally screw threaded as at 6. Each outer end of the bore flares outwardly to provide an inclined surface 7 of suitable shape, for example, part conical as shown.

The ferrule shown to an enlarged scale in Figure 3 consists of a thin sleeve 8 of metal preferably copper or copper alloy. The external surface is shaped, there being an inclined or wedge-like external portion 9 at the inner end (i. e. the end adapted to fit into the flared end of the bore). The surface of the wedge-like portion is preferably curved, but may also be part spherical or other suitable shape. The opposite end of the ferrule is formed with an inturned circumferential rim or lip 10 and the internal diameter of the ferrule closely approximates the diameter of the enlarged bore of the union which is of a diameter to allow the pipe end to fit snugly therein. In order that the ferrule can fit over the pipe end, a mandrel or other suitable tool of a diameter to fit within the ferrule is forced therein, so that the rimmed end is opened out, as shown in the left hand side of the drawing 3. However, any suitable manufacturing process may be employed to produce the ferrule, which must be so formed that it will slip over the pipe end and also fit within the union.

The gland nut 11 at each end is screw threaded internally to screw on to the pipe receiving end of the union, the end of said nut remote from the union having an inturned flange portion 12, the inner surface 13 of which slopes upwardly to meet the screw threaded internal bore of the nut, thus providing an inclined plane, or other suitable surface.

In using the coupling a gland nut 11 is firstly slipped over the end of the pipe to be connected into the union, and the ferrule 8 then slipped over said end with its wedge-like end 9 towards the pipe end. The said pipe end is then inserted in the enlarged bore of the union until its end butts against the shoulder 4. The gland nut is now tightened forcing the ferrule towards the fitting, the wedge-like end 9 engaging within the flared recess in the union provided for that purpose to form a seal, whilst the inclined plane within the gland nut bears on the rimmed end 10 of the ferrule. Continued tightening forces the rim hard on to the pipe surface, in which it will embed slightly and thereby lock the pipe, whilst the wedge-like inner end of the ferrule is forced hard into the flared recess, the ferrule deforming to provide an adequate seal. Moreover, the leading edge of the ferrule is inbent somewhat, so that it also grips the pipe and the pipe end is also forced hard into the union.

The joint can be made by inserting the pipe end in the already loosely assembled end of the union and then tightening the gland nut.

It will be seen that the portion of the ferrule between the wedge end and lip or rim is thinner than the ends, so that the applied pressure results in a bending of the intermediate part to deform the ferrule and cause the gripping action at both ends as shown in the right hand side of Figure 1, the ferrule in fact being bent so that its bore except for the ends becomes cylindrical, with the pipe fitting therein.

In the fragmentary view Figure 2 there is shown an arrangement which is intended to prevent any overtightening of the gland nut. As will be seen, the internal thread on the nut is carried in for such a distance that a shoulder 14 is formed, which shoulder is intended to butt against the end of the union as shown, thereby preventing overtightening, consequently minimising any danger of the ferrule buckling.

In Figures 4, 5 and 6 there are shown two forms of joint for flat ended fittings where the pipe end butts against the end of the union, such as a pillar cock.

In Figure 4, the end of the pillar cock 15 is coupled to the pipe end 5 by means of the ferrule or thimble 8 and the gland nut 11. The ferrule comprises the body 8 having a thickened inner end 9a and an inturned rim or circumferential lip 10 at its other end. The gland nut has the flange 12 at its outer end with a tapered, curved or similar part 13 to co-operate with the end of the ferrule. When the nut 11 is tightened, the inner flat end of the ferrule butts the end of the fitting and continued tightening will cause the lip to bed into the surface of the pipe 5, whilst forcing the flat end of the ferrule hard against the end of the fitting forming a seal. The friction between the lipped ferrule end and the surface 13 will be greater than the friction between the fitting and the inner end of the ferrule, owing to the curving of the surface 13 and as this will tend to turn the pipe, it may be desirable to interpose a friction ring 16 (Figure 5) between the end 10 and the fitting. This ring is proportioned so that upon tightening the combined frictional grip between the surfaces at this end is less than that between the butting inner end of the ferrule and the fitting. The inner end of this ring may butt the shoulder on the ferrule as shown, to prevent overtightening, or it may stop short thereof.

In Figures 4 and 5 a friction washer 17 of fibre or similar material may be interposed between the fitting end 15 and the pipe end 5. This may be simply placed in position as shown in Figures 4 and 5, or the end of the ferrule may be shaped to accommodate same as illustrated in Figure 6. In this, the inner ferrule end has a flange 18 against which the pipe end butts, and also has a circumferential groove for the reception of the washer 17.

Further, the parts may be arranged to prevent overtightening. Thus, the gland nut may have an internal shoulder 19 as shown in Figure 4 so that when tightened up the said shoulder meets the shoulder 20 on the ferrule, so preventing any buckling of the thin wall between the ferrule ends which might happen should excessive turning be applied to the gland nut.

In all of the examples illustrated it will be observed that the ferrule is constructed so that upon tightening the rim or lip at the end is forced down to grip or embed slightly in the surface of the pipe, with the inner surface of the ferrule becoming pressed down on the pipe surface. At the same time, the inner end of the pipe is forced into the fitting or union, and further the front end of the ferrule is forced into the fitting to provide pressure sealing. The inner surface of the ferrule also embraces the pipe end.

In an alternative arrangement not illustrated, the fitting or union and nut members have end flanges formed thereon of sufficient diameter to allow for the provision of a ring of bolts and nuts or other means to enable the union and nut member to be drawn together in the manner of a flanged joint without the use of external and internal screw threads. This arrangement is particularly applicable to joints for pipes of a diameter wherein the use of a large internally threaded nut would be impracticable.

An advantage of unions herein described is that the main gripping of the ferrule on the pipe by the lip is a short distance from the actual end of the pipe. This ensures an adequate grip without uneven deformation or buckling at the pipe end which might occur for example, if the pipe end was not pushed right home or was not cut off square.

I claim:

1. A pipe coupling comprising a tubular union having adjacent each of its ends an interior surface tapering inwardly, a pair of ferrule sleeves each having adjacent one of its ends an exterior surface tapering toward said end and adapted for wedging engagement with one of said interior surfaces, each of said sleeves also having a base widening towards its opposite end and deformable means originally extending radially at said last mentioned end inwardly of the base surface and toward the axis of said sleeve, and a pair of nuts each for threaded engagement with the exterior of an end portion of said union and each also including means engageable with the last-mentioned end of a sleeve to cause the radial means carried thereby to grip a pipe inserted in said nut, sleeve and union.

2. A pipe coupling comprising a fitting adapted to receive a pipe end, a union member fitting over the pipe end, and including tightening-up means, a ferrule sleeve for embracing said pipe end within the fitting and union member, said sleeve having one end portion thickened and having at the opposite end deformable means originally extending radially toward the sleeve axis, and means on said union member for engaging said last-named sleeve end to cause said radial means to grip said pipe end and to force said first named sleeve end into said fitting, said thickened sleeve end also serving as a pressure seal in coaction with said fitting.

3. A pipe coupling comprising a fitting adapted to receive a pipe end, a union member fitting over the pipe end and including means for tightening up said member, a ferrule sleeve for embracing said pipe end within said union member and fitting, said sleeve having a thickened end and deformable means originally extending radially inwardly of the inner sleeve surface toward the sleeve axis at the other sleeve end, and tapering means within said union member to engage said last named sleeve and to cause said radial means to grip the pipe upon the tightening up of said union member and to force said first named sleeve end into said fittings, said first named sleeve end serving as a pressure seal in combination with the fitting, and means to prevent overtightening of the coupling.

4. A pipe coupling comprising a fitting adapted to receive a pipe end, a union member fitting over the pipe end and including means for tightening up said member, a ferrule sleeve for embracing said pipe end within said union member and fitting, said sleeve having a thickened end and deformable means originally extending radially inwardly of the inner sleeve surface toward the sleeve axis at the other sleeve end, tapering means within said union member to engage said last named sleeve and to cause said radial means to grip the pipe upon the tightening up of said union member, and means on said fitting and member to prevent overtightening of the union member.

5. A pipe coupling, a pipe, a fitting adapted to receive an end of said pipe and forming therewith a recess in one end, a union member including tightening up means, and a ferrule sleeve having one end part outwardly flaring to receive the pipe end and having at that end deformable means originally extending radially inwardly of the inner sleeve surface toward the sleeve axis, said sleeve having its other end thickened and wedge-like, means on said pipe to abut said radial means upon tightening up said union member and insertion of said wedge-like sleeve end into said recess.

6. A pipe coupling comprising a fitting, a ferrule sleeve having in one end portion an outwardly flaring opening and means radially originally extending inwardly of the inner sleeve surface toward the sleeve axis at that end, said sleeve also having the opposite end portion thickened, wedge-like and curved, and a union with tightening means for forcing said radial means into a pipe and said wedge-like end into said fitting.

7. A pipe coupling according to claim 6 and wherein said union has an interior beveled surface engaging the first named sleeve end.

KENNETH CECIL HANSON.

REFERENCES CITED

The following references are of record in the file of this patent:

UNITED STATES PATENTS

| Number | Name | Date |
| --- | --- | --- |
| 1,736,154 | Goetzelman | Nov. 19, 1929 |
| 1,840,312 | Dunmire | Jan. 12, 1932 |
| 2,393,252 | Kaysing | Jan. 22, 1946 |